United States Patent

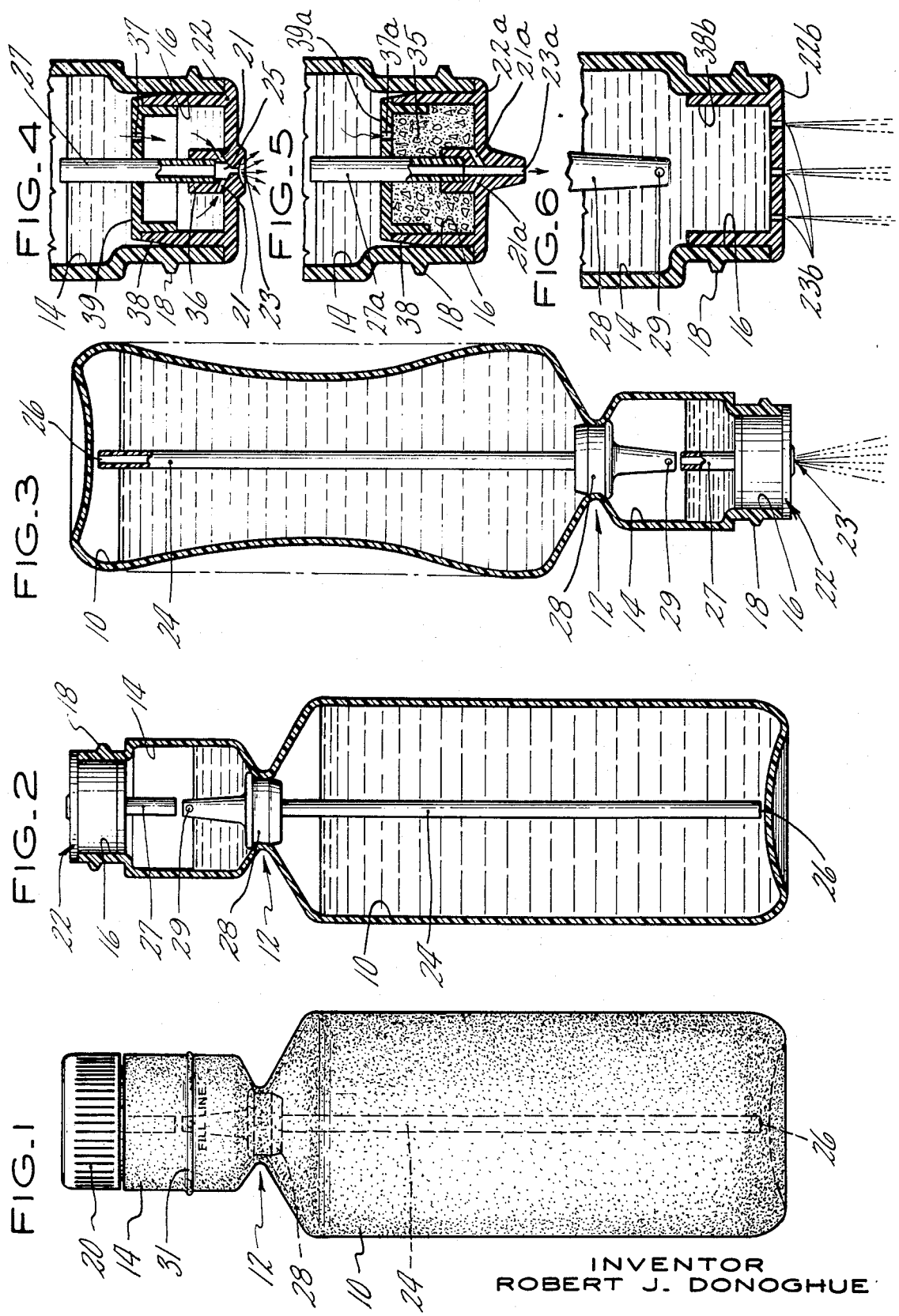

[11] 3,628,700

| [72] | Inventor | Robert J. Dodoghue |
| | | 900 Windsor Ave., Windsor, Conn. 06095 |
| [21] | Appl. No. | 829,553 |
| [22] | Filed | June 2, 1969 |
| [45] | Patented | Dec. 21, 1971 |

[54] PREMEASURED LIQUID SPRAY AND FOAM DISPENSER
4 Claims, 6 Drawing Figs.

[52] U.S. Cl. ..................................................... 222/207, 222/211
[51] Int. Cl. ...................................................... B65d 37/00
[50] Field of Search ........................................... 222/531, 207, 541, 565, 534, 211; 239/327

[56] References Cited
UNITED STATES PATENTS

| 762,818 | 6/1904 | Garwood | 222/565 X |
| 2,776,787 | 1/1957 | Nicol | 222/565 X |
| 3,318,494 | 5/1967 | Porter et al. | 222/534 |
| 307,506 | 11/1884 | Tomson | 222/541 |
| 3,010,613 | 11/1961 | Stossel | 222/207 X |
| 3,175,736 | 3/1965 | Pelto | 222/207 |
| 3,272,406 | 9/1966 | Lehmann | 222/531 |
| 3,346,146 | 10/1967 | Thompson | 222/207 X |
| 3,347,420 | 10/1967 | Donoghue | 222/207 X |
| 3,443,726 | 5/1969 | Muller et al. | 222/531 X |

FOREIGN PATENTS

| 110,059 | 8/1960 | Pakistan | 222/207 |

*Primary Examiner*—Samuel F. Coleman
*Assistant Examiner*—Frederick R. Handren

ABSTRACT: A container and closure assembly has a resilient lower storage chamber and a transparent upper dispensing chamber defined either in one unitary body, or in two units which are releasably secured to one another. A transfer tube in a fitment between the chambers serves to transfer a predetermined quantity of liquid from the lower to the upper chamber upon squeezing the lower one. The upper portion of the dispensing and measuring chamber has discharge orifices defined therein, or in an insert provided in a top opening thereof. The insert may comprise either an orifice pattern, an atomizing spray nozzle, or a foam nozzle and may be capped off by a conventional cap.

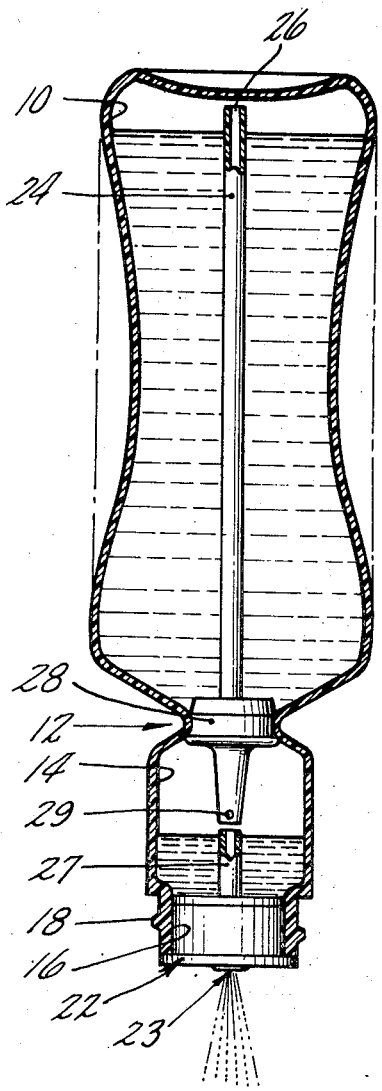

PREMEASURED LIQUID SPRAY AND FOAM DISPENSER

SUMMARY OF THE INVENTION

This invention relates generally to a liquid or powder dispensing device, and deals more particularly with a squeezable container and closure assembly having storage and dispensing chambers which communicate with one another through conduit means of the type shown and described in U.S. Pat. No. 3,347,420 issued to the inventor herein. In a container of the type referred to in the above-mentioned patent, the user merely squeezes the lower storage chamber defining portion of the bottle to force liquid or powder upwardly through the conduit means into the upper dispensing chamber defining portion thereof, and markings which may be provided on the device permit accurately measured quantities of the liquid or powder to be dispensed through a top opening therein. In accordance with the present invention, the upper portion of such a device further includes discharge orifices or nozzles through which the metered or measured quantity of liquid in a dispensing chamber can be forcibly emitted by inverting the device and by again squeezing the lower storage chamber defining portion thereof.

The advantages of a combination dispenser and measuring bottle of this type are many. For example, such a device would be ideal for the application of hair-treating chemicals of a type which must be accurately metered by the consumer, and which must be applied in a fine spray over a particular surface area. As will be apparent from the description to follow, other applications for a device constructed in accordance with the present invention are for dispensing predetermined quantities of liquid vitamins for use in hospitals or in other medicinal situations such as by a veterinarian.

As will be apparent from the description to follow, various types of nozzles can be utilized in a liquid or powder dispenser of the type shown and described herein. For example, the nozzle or discharge orifice portion of the device might be adapted for dispensing an atomized spray of liquid or powder, a stream or jet, a fan-shaped spray, or a foam in the event that the liquid stored is provided with a foaming agent.

It is a particular object of the invention to provide a container for dispensing selected quantities of fluid material, such as liquid or fluid powder, which is unitary in character and includes an enclosed metering reservoir fabricated as an integral portion of the overall container.

BRIEF DESCRIPTION OF THE DRAWINGS

FIG. 1 is an elevational view showing a squeezable container constructed in accordance with the present invention.

FIG. 2 is a vertical sectional view of the container shown in FIG. 1 with a quantity of liquid to be dispensed having been transferred from a lower storage chamber to an upper dispensing chamber.

FIG. 3 is a vertical sectional view of the container and closure assembly shown in FIG. 2, but with the device in its inverted position, and with the flexible sidewalls thereof compressed showing the liquid in the dispensing chamber being forcibly emitted through a nozzle provided for this purpose.

FIG. 4 is an enlarged vertical cross-sectional view through the nozzle shown in FIG. 3.

FIG. 5 is an enlarged vertical cross-sectional view through a nozzle of alternative construction for use in the container and closure assembly shown in FIGS. 1 through 3 inclusively.

FIG. 6 is an enlarged vertical cross-sectional view through a second alternative nozzle construction adapted for use in the container and closure assembly shown in FIGS. 1 through 3 inclusively.

DETAILED DESCRIPTION

One presently preferred form of container and closure assembly incorporating the present invention is shown in FIGS. 1 through 4 inclusively wherein the body or container portion thereof is preferably molded of a light transmitting thermoplastic moldable material such as polyethylene, polyvinylchloride, or the like to provide at least one storage chamber 10 having relatively this but sturdy flexible resilient walls which are adapted to be squeezed from the broken line position shown in FIG. 3 to the solid line position shown therein. The upper portion of the device is separated from the reservoir or storage defining chamber 10 by integrally molded wall means, indicated at 12 in FIGS. 2 and 3, which wall means comprises a necked down position of a generally cylindrical container shown. It will of course be apparent to those skilled in the art that the cylindrical shape for the device of FIGS. 1, 2 and 3 is illustrated by way of example only, and that its associated chamber might also be defined as part of a multicompartment container as described in the above-mentioned patent. It is also noted that depending upon the size of the particular device in relationship particularly to the thickness of its sidewalls, reinforcing webs might be provided in the area of the necked down wall means 12 connecting the reservoir or storage defining chamber 10 with the upper portion of the device as is also shown in the above-mentioned patent.

The storage defining chamber 10 is operably associated with an upper measuring or dispensing chamber 14, and the upper chamber defines an opening 16 having integrally formed threads or securing means 18 in the form of a molded thread for threadably receiving a conventional screw cap 20. The opening 16 is preferably provided with a suitable diameter for snugly receiving nozzle means indicated generally at 22 and shown in greater detail in FIG. 4 for a purpose to be described herein below.

Conduit means extends between the lower storage chamber 10 and the upper dispensing chamber 14, with an inlet end 26 adjacent the lower portion of the storage chamber 10 and a discharge end spaced above the lower boundary of the dispensing chamber so that upon squeezing of the manually deformable wall portions which define the storage chamber 10 a quantity of liquid can be transferred from the storage chamber through the conduit means into the dispensing chamber 14 to achieve the condition shown in FIG. 2. Preferably, and as shown in FIGS. 2 and 3, said conduit means comprises a tubular member or transfer tube 24 having an inlet end 26 in the storage chamber 10 as mentioned above. The conduit means further includes a fitment 28 for receiving the upper end of the tube 24, and the fitment is retained in an opening defined in the wall means 12 either by a press fit, sonic welding, or by other suitable means as for example said fitment might be releasably secured in this opening as described in greater detail in my patent application entitled "Refillable Liquid Dispenser" filed Feb. 19, 1969 under Ser. No. 800,456, now U.S. Pat. No. 3,581,953. The said fitment 28 has an upper discharge end defining a port 29 which opens toward the sidewall of the dispensing chamber 14 and through which the liquid being transferred into the dispensing chamber is emitted during the process of filling the dispensing chamber to predetermined level as for example to the level indicated by the fill line 31 of FIG. 1. The reader is referred to either one of my above-mentioned patents or applications for a more complete description of the conduit means comprising the transfer tube 24 and the fitment 28.

In accordance with the present invention, the container and closure assembly, and more particularly that portion thereof which defines the dispensing chamber 14 has at least one discharge orifice through which the quantity of liquid which has been previously transferred to the dispensing chamber is adapted to be forcibly emitted by inverting the assembly as shown in FIG. 3 and again compressing the sidewall portions to cause air under pressure to flow through the inlet end 26 of the transfer tube 24 through said tube and through the fitment 28 so as to pressurize the dispensing chamber 14 and hence forcibly emit the liquid contained therein through an orifice which may be defined in a nozzle part shown at 22.

FIGS. 1 through 6 inclusively show a container and closure assembly constructed in accordance with the present invention wherein the storage and dispensing chambers are defined in a single unitary body including integral wall means therebetween for defining the opening which receives the fitment portion of the conduit means.

Considering first the atomizer nozzle construction shown in FIG. 4, the top opening 16 of the upper portion of the unitary container and closure assembly is shown in its inverted position corresponding to that of FIG. 3 with a nozzle defining plug or insert 22 being retained in said opening either by sonic welding or by a press fit. As shown, the insert or plug 22 defines a single-discharge orifice 23 which communicates with a small internal-mixing chamber 25 in which air and the liquid to be dispensed are mixed so as to form an atomizing spray at the discharge orifice 23. The level of the liquid in the dispensing chamber 14 corresponding to the fill line 31 in FIG. 1 is shown with the device in its inverted condition in FIG. 4 as being below the upper end of a tube 27 and the tube 27 has its lower end communicating with the mixing chamber or cavity 25 so as to introduce air under pressure to said cavity for combining the same with the liquid to be dispensed. The insert or plug 22 further defines means forming a constricted liquid passageway for allowing the liquid to reach the mixing cavity at the desired rate. As shown in FIG. 4 said means comprises constricted passageways 21, 21 in an upstanding annular portion 36 of the plug 22. The plug or insert 22 further includes another annular portion 38 for fitting within the opening 16 of the upper dispensing defining chamber portion of the assembly and a cap portion 39 is preferably provided in the upper end of the outer annular portion 38 with a constrictive opening 37 being defined therein for allowing the liquid to pass from a dispensing chamber downwardly so as to reach the interior of the plug 22 and hence to be available at the inlet end of the constricted portion of the passageway defining means as indicated generally at 21. As so constructed and arranged liquid and air are mixed in the discharge of the resulting mixture through the discharge orifice 23 in the form of an atomized spray. One such construction for an aerosol atomizing nozzle is shown in U.S. Pat. No. 2,980,342 issued to Armour on Apr. 18, 1961.

FIG. 5 shows an alternative construction for the nozzle plug or insert 22a wherein liquid to be dispensed has a foaming agent combined therein so as to produce a ribbon of foam material at the discharge orifice nozzle opening 23a. Constricted passageways 21a, 21a are provided for the liquid, and, as required, one or more ports 37a in the cap portion 39a of the nozzle plug 22a serve to emit fluid underpressure to the interior of the nozzle plug 22a. The interior of the plug 22a defines an intermediate chamber which is in communication with the dispensing chamber 14 and with the discharge orifice 23a, and in order to provide the desired foaming action at the latter opening a cellular material is provided within, and substantially fills the intermediate chamber so as to throttle the liquid. Any porous material which is liquid absorbing can be used in the intermediate chamber for achieving this throttling action. Exemplary materials are the natural sponges and the synthetic spongelike materials such as polyurethane, foam rubber, vinylite sponges, polyester sponges, and the like. These synthetic materials are preferred in that the irregular and tortuous paths extending from surface to surface of the materials are highly conducive to the production of foam.

Considering next the nozzle plug or insert 22b shown in FIG. 6, a series of discharge orifices 23b, 23b are defined in the lower wall of the plug 22b, which plug is retained in the opening 16. Upon inversion of the container and closure assembly, and squeezing of the lower portion thereof as shown in FIG. 3, air under pressure is forced through the opening 29 in the fitment 28 causing the premeasured quantity of liquid in the dispensing chamber 15 to be forcibly emitted through the discharge orifices 23b, 23b in the same manner described herein above with reference to the FIG. 4 and FIG. 6 embodiments.

The term "liquid" as used in the appended claims is intended to include an incompressible fluid, or a powder of liquidlike consistency.

I claim:

1. A container enclosure assembly having a lower storage chamber and an upper dispensing chamber and wall means defining a fitment opening therebetween, a fitment in said opening having an upwardly extending portion and defining an internal through passageway which terminates in an outlet port located in spaced relationship above the lower boundary of said dispensing chamber, said outlet port being defined in the sidewall of said fitment so as to direct liquid laterally outwardly toward the sidewalls of the dispensing chamber, a transfer tube having its upper end received in the lower end of said fitment passageway, said tube having its lower end adjacent the lower portion of said storage chamber, said tube having a cross sectional area which is constant throughout its length and which tube area is significantly less than that of said fitment opening, said storage chamber having manually deformable wall portions, nozzle structure provided in the top of said dispensing chamber, said nozzle structure including a discharge orifice and means forming a mixing cavity communicating with and located adjacent said discharge orifice, a standpipe tube having one end communicating with said mixing cavity and its other end located in said dispensing chamber for delivering air under pressure to said mixing cavity, means forming a constricted liquid passageway between the dispensing chamber and the mixing cavity for emitting an atomized spray at said discharge orifice.

2. The combination defined in claim 1 wherein said nozzle structure further includes cellular material within and substantially filling an intermediate chamber which is in communication with said dispensing chamber, said standpipe tube having one end communicating with said discharge orifice and its other end located in said dispensing chamber whereby the liquid emitted is discharged in a foamy state.

3. The combination defined in claim 1 wherein said nozzle structure comprises an insert in a top opening defined in the upper portion of said dispensing chamber.

4. The combination defined in claim 1 wherein said storage and dispensing chambers are defined in a single unitary body including integral wall means therebetween, said wall means defining said fitment opening between said chambers.

* * * * *